United States Patent
Yan

(10) Patent No.: US 12,276,342 B1
(45) Date of Patent: Apr. 15, 2025

(54) FLOW DIVISION WATER OUTLET DEVICE

(71) Applicant: ZHEJIANG SUNMIXER SANITARY WARE CO., LTD., Taizhou (CN)

(72) Inventor: Lingguang Yan, Taizhou (CN)

(73) Assignee: ZHEJIANG SUNMIXER SANITARY WARE CO., LTD., Taizhou (CN)

( * ) Notice: Subject to any disclaimer, the term of this patent is extended or adjusted under 35 U.S.C. 154(b) by 0 days.

(21) Appl. No.: 18/878,911

(22) PCT Filed: Sep. 24, 2022

(86) PCT No.: PCT/CN2022/121142
§ 371 (c)(1),
(2) Date: Dec. 26, 2024

(87) PCT Pub. No.: WO2023/046124
PCT Pub. Date: Mar. 30, 2023

(30) Foreign Application Priority Data

Sep. 25, 2021 (CN) .......................... 202122328263.3

(51) Int. Cl.
| | |
|---|---|
| *F16K 11/078* | (2006.01) |
| *A47L 15/00* | (2006.01) |
| *A47L 15/42* | (2006.01) |
| *E03C 1/04* | (2006.01) |

(52) U.S. Cl.
CPC ...... *F16K 11/0787* (2013.01); *A47L 15/0065* (2013.01); *A47L 15/4217* (2013.01); *A47L 15/4223* (2013.01); *E03C 1/04* (2013.01)

(58) Field of Classification Search
None
See application file for complete search history.

(56) References Cited

U.S. PATENT DOCUMENTS

| | | |
|---|---|---|
| 8,646,476 B2 | 2/2014 | Thomas et al. |
| 2008/0142095 A1 | 6/2008 | Van Der Linden |
| 2009/0266913 A1 | 10/2009 | Tsai |
| 2014/0196806 A1 | 7/2014 | Sharratt et al. |
| 2019/0049023 A1 | 2/2019 | Gong et al. |
| 2021/0005213 A1 | 1/2021 | Goldstein et al. |
| 2021/0052131 A1 | 2/2021 | Cipriani et al. |

FOREIGN PATENT DOCUMENTS

| | | |
|---|---|---|
| CN | 1667306 A | 9/2005 |
| CN | 202790689 U | 3/2013 |
| CN | 205592430 U | 9/2016 |

(Continued)

*Primary Examiner* — Rita P Adhlakha
(74) *Attorney, Agent, or Firm* — Bayramoglu Law Offices LLC

(57) ABSTRACT

A flow division water outlet device is provided. The flow division water outlet device includes: a device body, which is internally provided with a flow division seat. The flow division seat divides the inside of the device body into a first water outlet cavity, a second water outlet cavity, an accommodating cavity and a guide-in cavity. A water inlet passage is formed between the accommodating cavity and the guide-in cavity. A water division valve element is further included, which is at least provided with: a valve body having a water inlet, first water outlets and a second water outlet, and a valve rod, one end of the valve rod is at least partially arranged in the valve body in a penetrating manner and the valve rod rotates to independently open the first water outlets or the second water outlet.

7 Claims, 16 Drawing Sheets

(56) References Cited

FOREIGN PATENT DOCUMENTS

| | | | |
|---|---|---|---|
| CN | 110274050 | A | 9/2019 |
| CN | 209839227 | U | 12/2019 |
| CN | 112392104 | A | 2/2021 |
| EP | 0844423 | A2 | 5/1998 |
| EP | 0844423 | A3 | 10/1998 |
| EP | 2146123 | A2 | 1/2010 |
| EP | 2146123 | A3 | 10/2013 |
| GB | 2154705 | A | 9/1985 |
| KR | 100880032 | B1 | 1/2009 |
| WO | 9204565 | A1 | 3/1992 |
| WO | 2009091135 | A2 | 7/2009 |
| WO | 2018191079 | A1 | 10/2018 |

FLOW DIVISION WATER OUTLET DEVICE

CROSS-REFERENCE TO THE RELATED APPLICATIONS

This application is the national phase entry of International Application No. PCT/CN2022/121142, filed on Sep. 24, 2022, which is based upon and claims priority to Chinese Patent Application No. 202122328263.3, filed on Sep. 25, 2021, the entire contents of which are incorporated herein by reference.

TECHNICAL FIELD

The present invention belongs to the technical field of sanitary appliances, and particularly relates to a flow division water outlet device.

BACKGROUND

At present, as more and more attention has been paid to food hygiene, cups are cleaned more and more finely. Cup cleaners are applied more and more extensively, particularly in the industry of sanitary appliances. There are many patents related to cup cleaners. For example, patent No. 2018112269178 specifically disclosed a structure of a cup cleaner.

However, in practical use, a cup cleaner for cleaning is usually not used independently and needs to be matched with a water tap for use. An existing water tap and cup cleaner are separately connected with two pipelines. However, in practical use, they are usually matched, and separately connecting two pipelines may increase the complexity of the pipeline as well as the mounting cost.

SUMMARY

An objective of the present invention is to provide a flow division water outlet device capable of independently supplying two pipelines through one switch.

The objective of the present invention is achieved as follows. A flow division water outlet device is configured to guide a water flow to a first water outlet member and a second water outlet member respectively and includes:
  a device body, internally provided with a flow division seat. The flow division seat divides the inside of the device body into a first water outlet cavity, a second water outlet cavity, an accommodating cavity and a guide-in cavity.
  The first water outlet cavity guides the water flow to the first water outlet member. A first flow passage is formed between the first water outlet cavity and the accommodating cavity.
  The second water outlet cavity guides the water flow to the second water outlet member. A second flow passage is formed between the second water outlet cavity and the accommodating cavity.
  A water inlet passage is formed between the accommodating cavity and the guide-in cavity.
  The flow division water outlet device further includes a water division valve element, disposed in the accommodating cavity and configured to guide the water flow to the first flow passage and the second flow passage respectively. The water division valve element is at least provided with:
    a valve body, provided with a water inlet corresponding to the water inlet passage as well as first water outlets and second water outlet corresponding to the first flow passage and the second flow passage respectively; and
    a valve rod, one end being at least partially arranged in the valve body in a penetrating manner, and rotating to independently open the first water outlets or the second water outlet.

Therefore, the flow division water outlet device at least has the following two states:
  the water flow flows to the first flow passage through the water inlet and the first water outlets when the first water outlets are opened; or
  the water flow flows to the second flow passage through the water inlet and the second water outlet when the second water outlet is opened.

Preferably, the flow division seat is provided with:
  a flow division upper wall, configured to separate the accommodating cavity from the first water outlet cavity, the first flow passage being formed between the flow division upper wall and an inner wall surface of the device body; and
  a flow division lower wall, configured to separate the guide-in cavity from the second water outlet cavity and cause the water flow to flow through the flow division lower wall after entering from the guide-in cavity and then enter the accommodating cavity.

Preferably, the flow division seat is provided with a second flow passage penetrating through the flow division seat and communicated with the second water outlet cavity and the second water outlet respectively.

Preferably, the water inlet passage is formed in the flow division seat, and includes a hot water flow passage and a cold water flow passage.

The water inlet includes:
  a cold water inlet, communicated with one end of the cold water flow passage; and
  a hot water inlet, communicated with one end of the hot water flow passage.

Preferably, at least one of the hot water flow passage and the cold water flow passage is a flow passage with a straight corner.

Preferably, the valve rod at least partially extends from the device body.

The flow division water outlet device is further provided with a handle. A driving hole is formed in the handle. The handle drives the valve rod to rotate through the driving hole when rotating.

Preferably, the first water outlet member is a water tap, of which a water outlet end is capable of rotating to be above a cup cleaner.

The second water outlet member is the cup cleaner, such that the cup cleaner and the water tap may clean an inner lateral surface and an outer lateral surface of a container respectively when the water outlet end of the water tap rotates to be above the cup cleaner.

Preferably, the cup cleaner is provided with:
  a tray, provided with an outlet for water to flow out of the tray; and
  an elastic water outlet device, provided with a plurality of spraying arms. The spraying arms are configured to spray water in the second water outlet cavity to an object to be cleaned.

Preferably, one end of the device body is provided with a cup cleaner mounting position. An upper end of the mounting position is a bevel configured to enable water to flow out through the outlet.

Alternatively, a lower end face inside the tray is a bevel such that water may flow out through the outlet.

Preferably, a fastener is further disposed on the tray, and the fastener penetrates through both the tray and the cup cleaner mounting position.

Compared with the prior art, the present invention has the following outstanding and beneficial technical effects.

1. The water outlet device of the present invention may independently manage two water outlet members respectively on the same device and even independently provide three states, i.e., cold water, hot water and cold-hot mixed water for any one of the two water outlet members. Particularly, the first water outlet member is arranged to be a water tap, and the second water outlet member is arranged to be a cup cleaner, so that water may be independently supplied to the water tap or the cup cleaner. In addition, the water supply state includes three water discharge states, i.e., cold water, hot water and cold-hot mixed water. Moreover, the water discharge of the two water outlet members is independently controlled by one switch.

2. The present invention has low requirements on the water outlet member and may be applied to various water outlet members, and free combination may be implemented. Compared with an existing water outlet device, the water outlet device of the present invention is more integrated and convenient.

3. In the present invention, the upper surface of the cup cleaner has a bevel after mounting, and the bevel may discharge water from the outlet to prevent the accumulation of water.

4. In the present invention, the cup cleaner is connected with the device body through the fastener, so that the cup cleaner may be prevented from rotating.

In the figures: 1—device body; 2—water division valve element; 3—handle; 4—cup cleaner; 5—water tap; 11—guide-in cavity; 12—first water outlet cavity; 13—second water outlet cavity; 14—flow division seat; 15—first flow passage; 16—accommodating cavity; 17—mounting position; 21—valve body; 22—first water outlet; 23—second water outlet; 24—cold water inlet; 25—hot water inlet; 26—valve rod; 28—positioning convex column; 31—driving hole; 32—driving rod; 41—tray; 42—outlet; 43—elastic water outlet device; 44—spraying arm; 141—flow division upper wall; 142—second flow passage; 143—hot water flow passage; 144—cold water flow passage; 145—positioning hole; 146—drainage clearance; and 147—flow division lower wall.

DETAILED DESCRIPTION OF THE EMBODIMENTS

The present invention will be further described below with specific examples.

In order to solve the technical problems mentioned in the Background, the present invention specifically provides a water outlet device capable of independently managing two water outlet members respectively on the same device and even independently providing cold water, hot water and cold-hot mixed water for a certain water outlet member.

The technical solution of the present invention will be now specifically described with structures of different flow division water outlet devices.

Example 1

Figure 1:
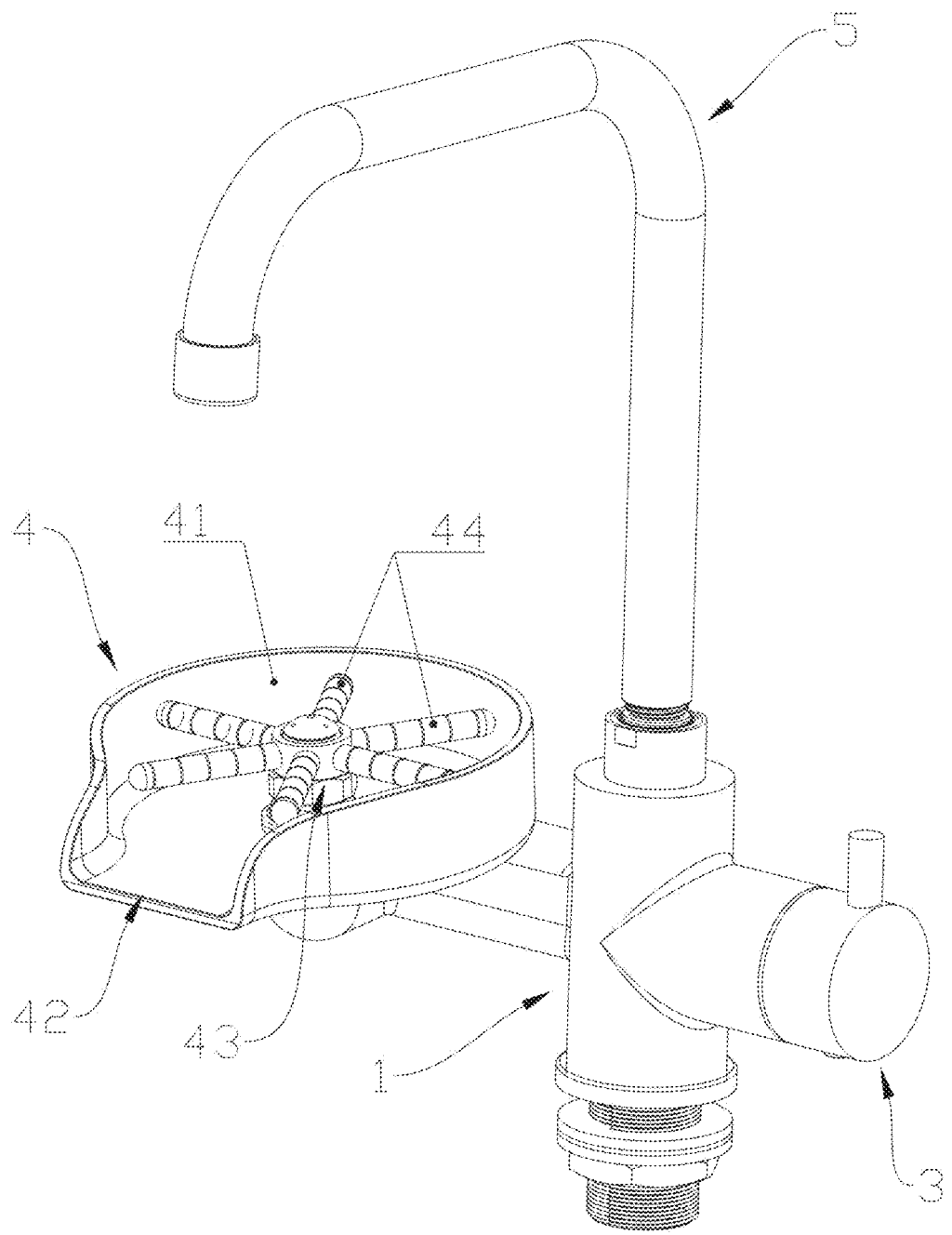
FIG. 1 shows a flow division water outlet device with matched cup cleaner and water tap.
Figure 2:
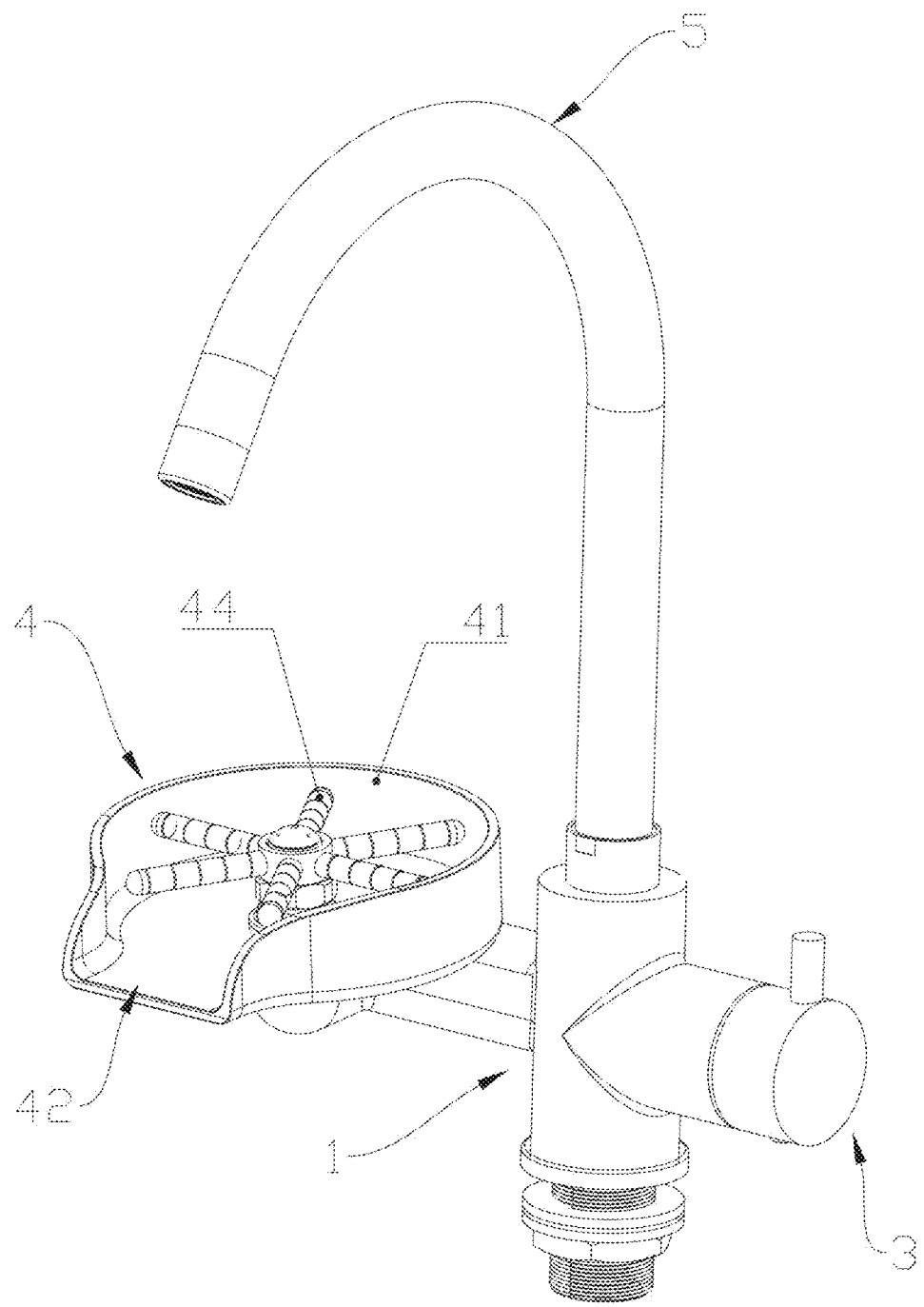
FIG. 2 shows another flow division water outlet device with matched cup cleaner and water tap.

As shown in FIGS. 1 and 2, each of FIGS. 1 and 2 shows a flow division water outlet device with matched the cup cleaner 4 and the water tap 5. The difference between FIGS. 1 and 2 is that the water taps 5 are of different styles.

Figure 3:
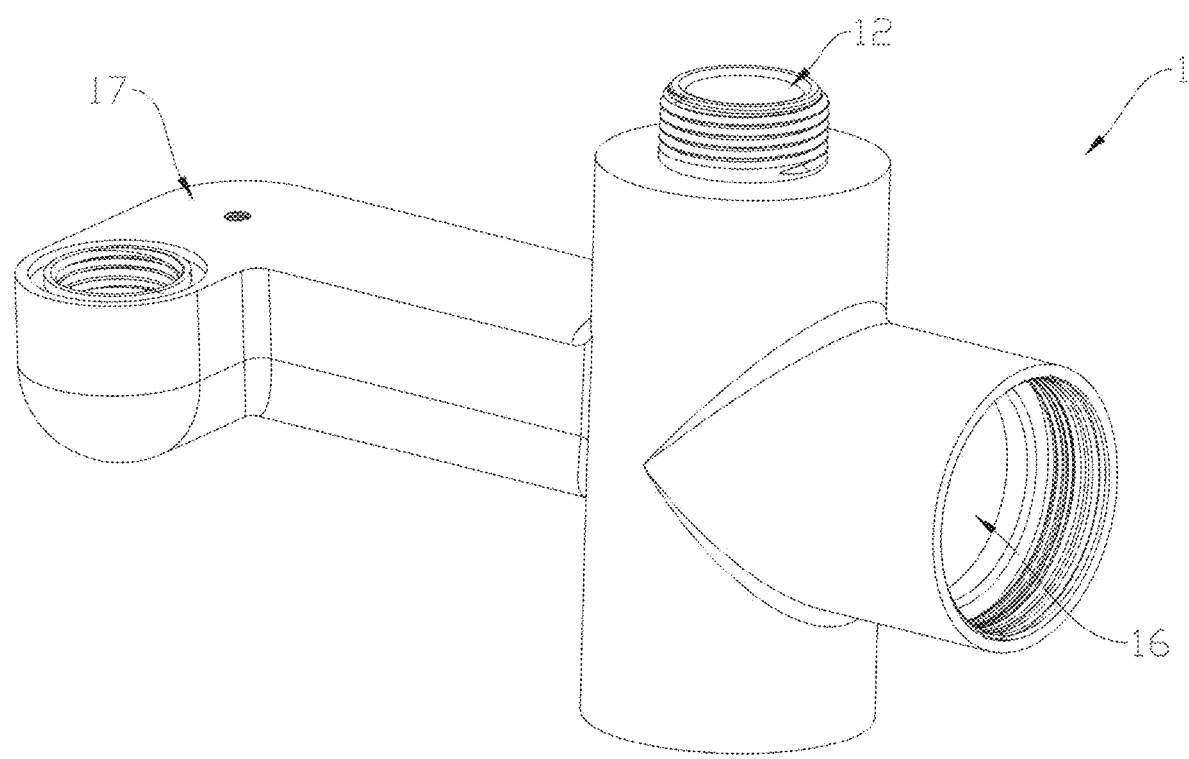
FIG. 3 is a three-dimensional diagram of a device body.

It can be seen from the two figures that the flow division water outlet device in the present example is provided with the device body 1. Simultaneously referring to FIG. 3, FIG. 3 is a three-dimensional diagram of the device body 1 in the present example. It can be seen from FIGS. 1 to 3 that the device body 1 is generally a columnar body, and is horizontally arranged in practical applications.

From the views of FIGS. 1 and 2, a first water outlet member is connected to a middle upper position of the device body 1. In the present example, the first water outlet member is the water tap 5. Moreover, it can be seen from the above that the water taps 5 in FIGS. 1 and 2 are in different shapes and thus may be matched according to a practical application scene and user preferences.

In addition, a joint configured to externally connect a pipeline is arranged at a middle lower position of the device body 1. The joint is configured to externally connect municipal tap water. In the present example, it is needed to provide the cold-hot mixed water, so the joint is also connected with hot water in practical use.

Moreover, a second water outlet member, i.e., the cup cleaner 4 in the present example, is connected to a left side of the device body 1. In the present example, the first water outlet member is the water tap 5, and the second water outlet member is the cup cleaner 4. There are other combinations in practical use. Specific introductions will be made in the following other examples.

In addition, in the present example, the water tap 5 is designed to be rotatable. A water outlet end of the water tap 5 may rotate to be above the cup cleaner 4. Meanwhile, the cup cleaner 4 is matched for use, so that the cup cleaner 4 and the water tap 5 may clean an inner lateral surface and an outer lateral surface of a container respectively when the water outlet end of the water tap 5 rotates to be above the cup cleaner 4. Therefore, the container cleaning efficiency may be improved.

Meanwhile, it can be seen from FIGS. 1 and 2 that the handle 3 is mounted to the left side of the device body 1.

Therefore, the technical effect to be achieved in the present example is to guide a water flow to the first water outlet member and the second water outlet member respectively through the flow division water outlet device.

A specific implementation principle is as follows. As shown in FIG. 3, the device body 1 is provided with the guide-in cavity 11 configured for water to flow in, equivalent to a guide-in flow passage, the first water outlet cavity 12 configured to guide the water to the first water outlet member, the second water outlet cavity 13 configured to guide the water to the second water outlet member, and a port connected with the handle 3.

Figure 4:
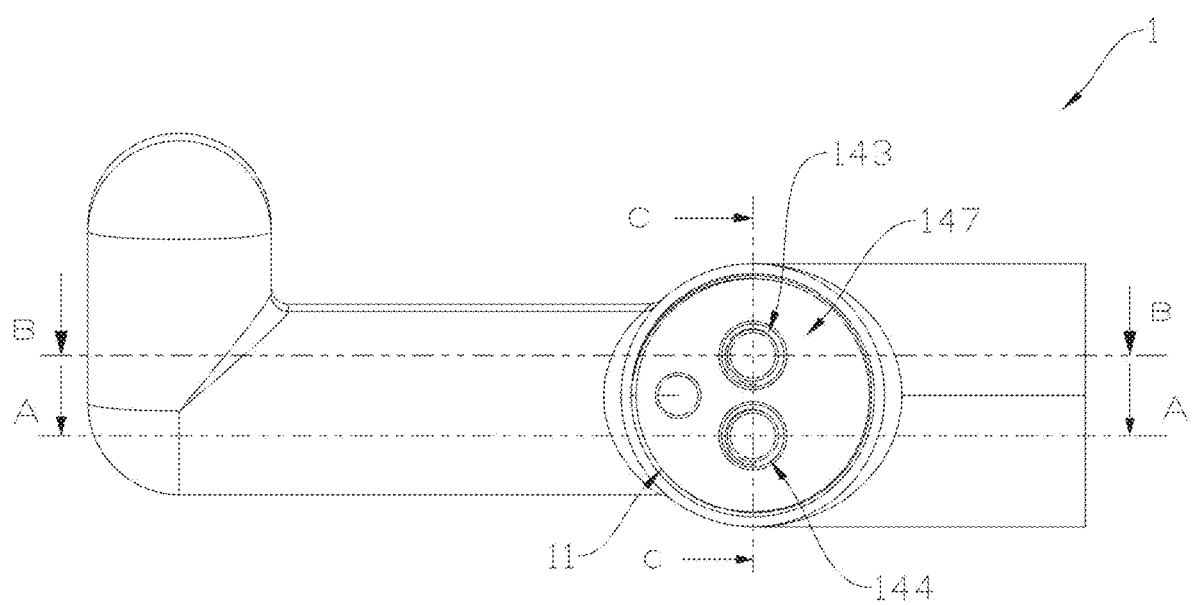
FIG. 4 is a bottom view of a device body.

As shown in FIG. 4, FIG. 4 is a bottom view of the device body 1, and the bottom of the device body 1 may be seen.

It can be seen from FIG. 4 that the device body 1 is provided with a plane covering the guide-in cavity 11 at the tail end of the guide-in cavity 11. There are totally three holes in the plane, of which two larger holes are the hot water flow passage 143 and the cold water flow passage 144 respectively. For the ease of description, the hole on the upper side in FIG. 4 is defined as the hot water flow passage 143, and the hole on the lower side is defined as the cold water flow passage 144. It can be seen from FIG. 4 that the above-mentioned plane is the flow division lower wall 147.

Figure 5:
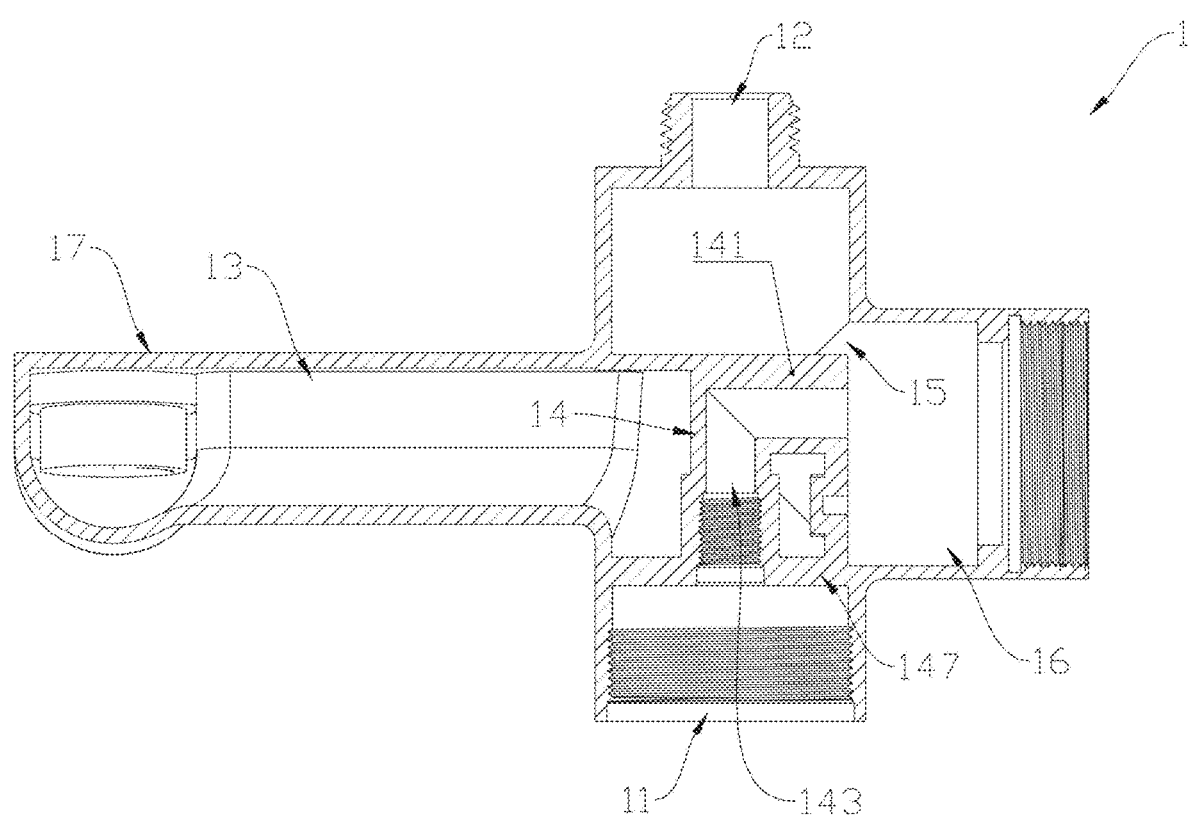
FIG. 5 is a sectional view along an A-A direction in FIG. 4.

Referring to FIG. 5, FIG. 5 is a sectional view along an A-A direction in FIG. 4, specifically a horizontal sectional view from the center of the hot water flow passage 143.

Figure 6:
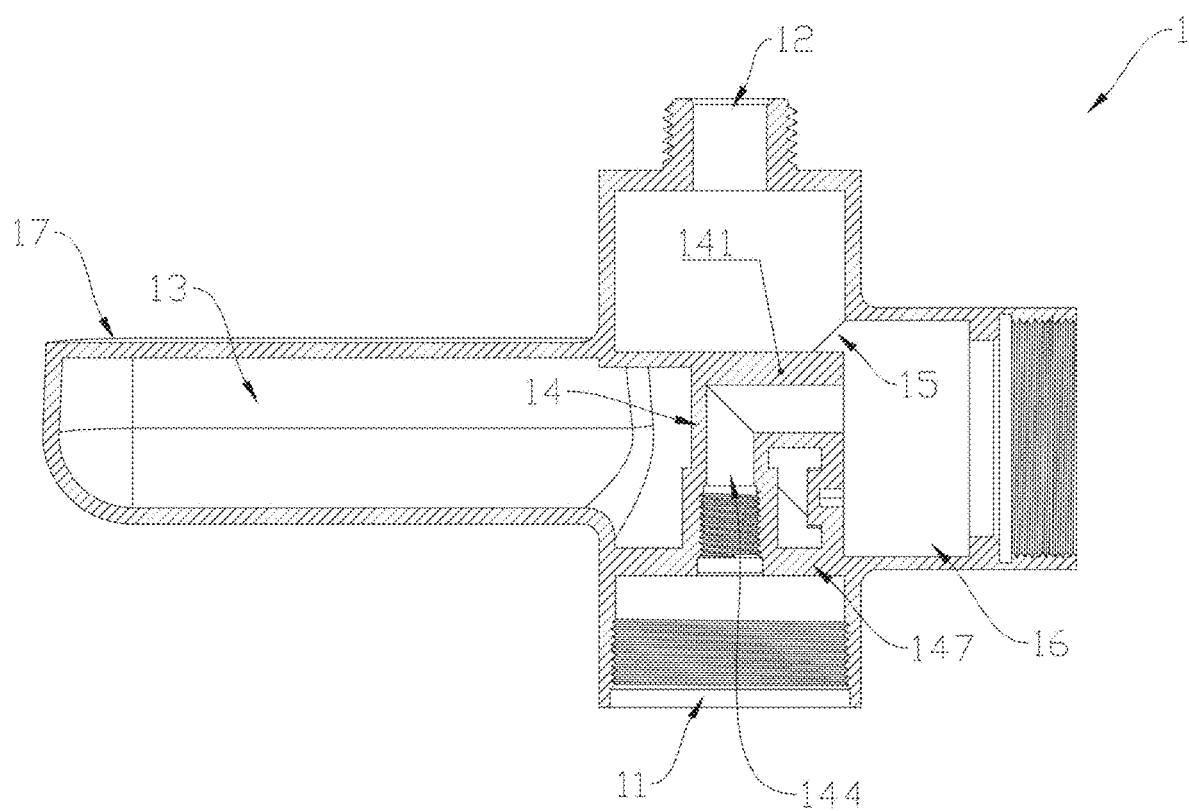
FIG. 6 is a sectional view along a B-B direction in FIG. 4.

Referring to FIG. 6, FIG. 6 is a sectional view along a B-B direction in FIG. 4, specifically a horizontal sectional view from the center of the cold water flow passage 144.

In combination with FIGS. 5 and 6, it can be seen that the device body 1 is internally provided with the guide-in cavity 11, the first water outlet cavity 12 configured to guide water to the first water outlet member, the second water outlet cavity 13 configured to guide the water to the second water outlet member, a port connected with the handle 3, and the flow division seat 14. The flow division seat 14 is located at a junction of the first water outlet cavity 12, the second water outlet cavity 13 and the guide-in cavity 11.

It can be seen from FIGS. 5 and 6 that the cold water flow passage 144 and the hot water flow passage 143 are formed in the flow division seat 14. Moreover, it can be seen from FIG. 5 that the hot water flow passage 143 is a flow passage with a straight corner. It can be seen from FIG. 6 that the cold water flow passage 144 is a flow passage with a straight corner.

Figure 7:
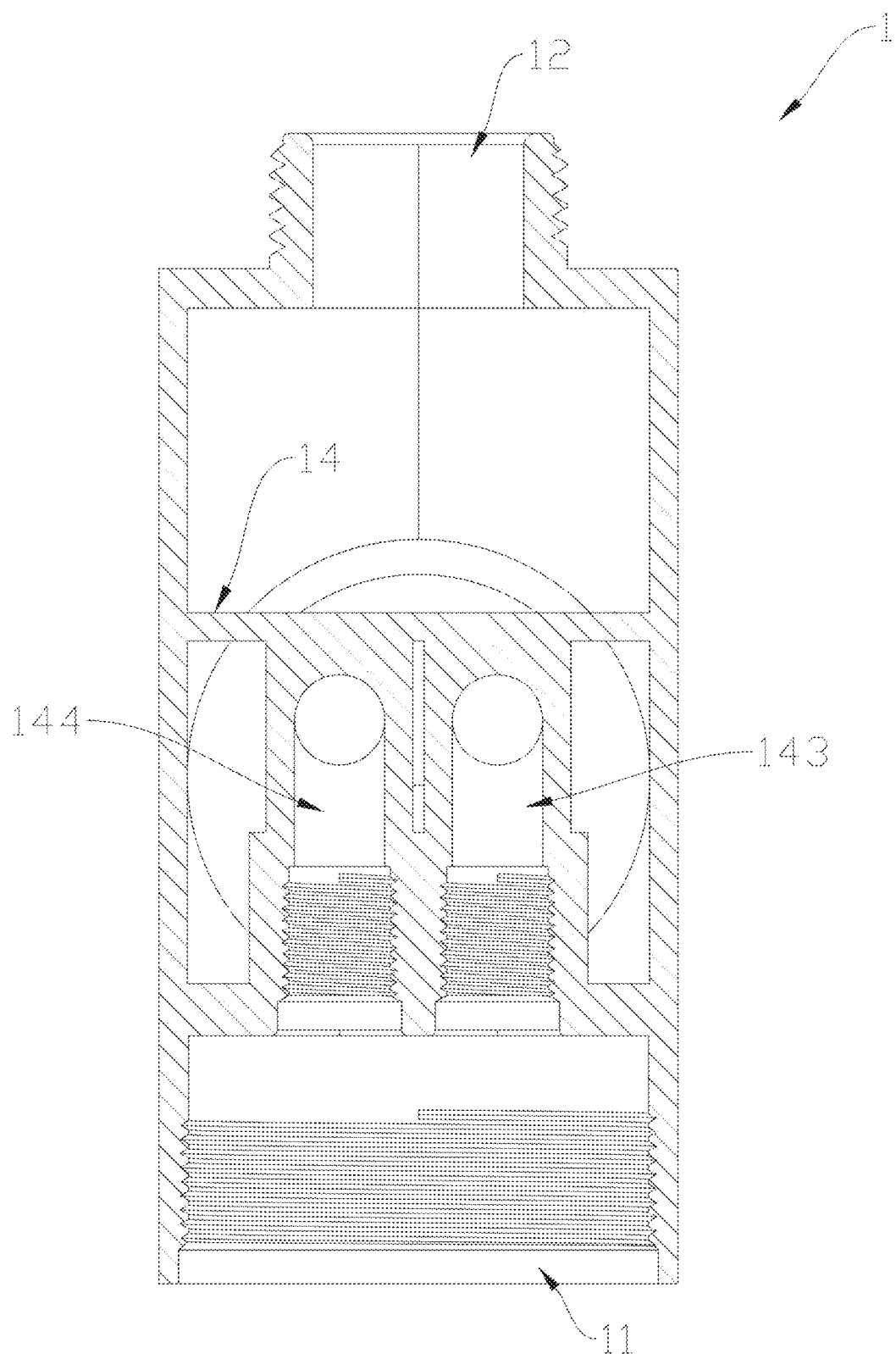
FIG. 7 is a sectional view along a C-C direction in FIG. 4.

Referring to FIG. 7, FIG. 7 is a sectional view along a C-C direction in FIG. 4. It can be seen from FIG. 7 that the cold water flow passage 144 and the hot water flow passage 143 are communicated with the guide-in cavity 11 respectively, and surfaces of sides of the cold water flow passage 144 and the hot water flow passage 143 close to the guide-in cavity 11 are connected with the device body 1. Therefore, a water flow can only enter from the cold water flow passage 144 and the hot water flow passage 143. Therefore, it is to be pointed out that, in the present example, the hot water flow passage 143 needs to be connected with hot tap water and the flow division water outlet device does not heat the water flow.

Moreover, as shown in FIGS. 5 and 6, both the hot water flow passage 143 and the cold water flow passage 144 guide the water flow in the guide-in cavity 11 to a left-side chamber of the flow division seat 14. The left-side chamber is configured to hold the water division valve element 2 configured to guide the water flow to the first water outlet cavity 12 and the second water outlet cavity 13 respectively.

Figure 10:
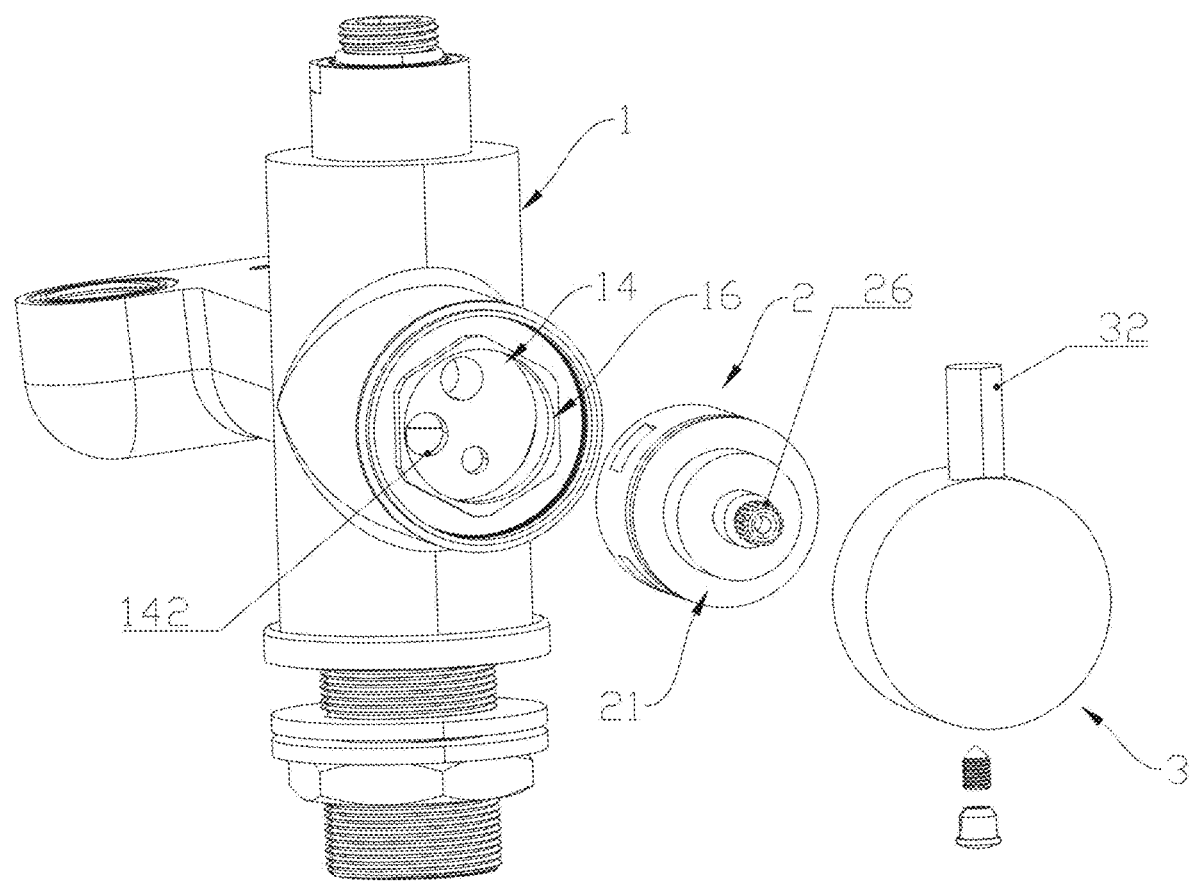
FIG. 10 is an exploded view after the cup cleaner and water tap in FIG. 1 are hidden.
Figure 11:
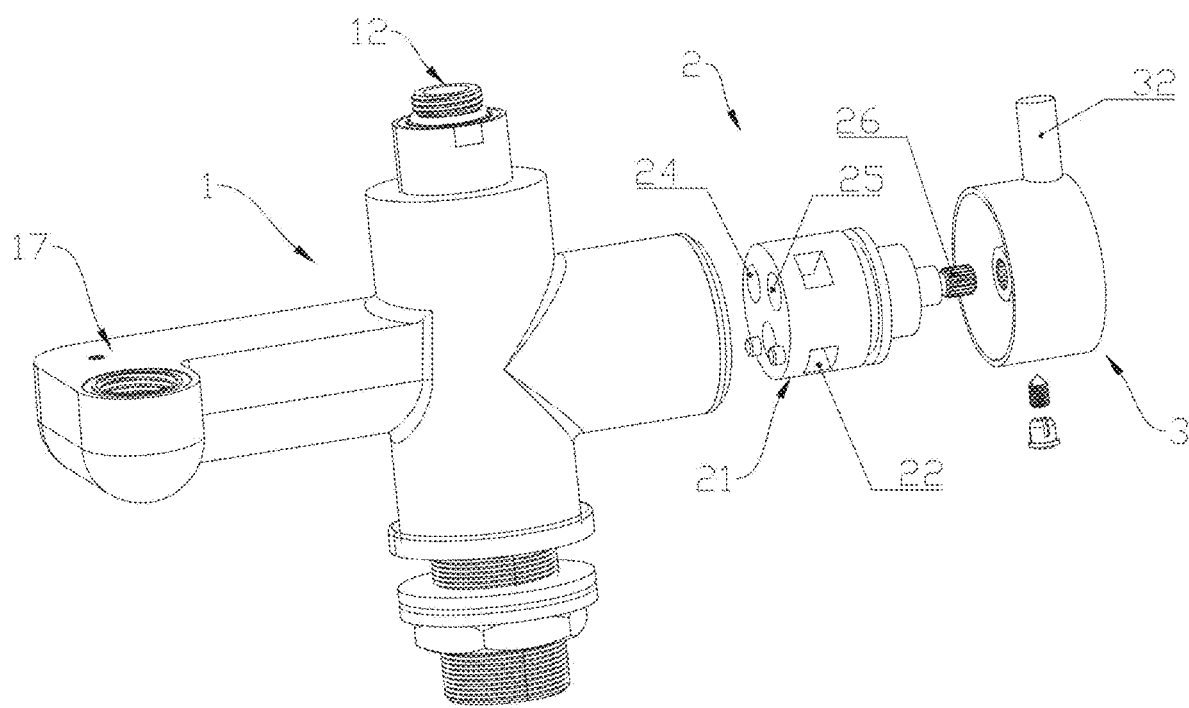
FIG. 11 is another exploded view after the cup cleaner and water tap in FIG. 1 are hidden.

Specifically, as shown in FIG. 10, FIG. 10 is an exploded view after the cup cleaner 4 and the water tap 5 in FIG. 1 are hidden. Then, referring to FIG. 11, FIG. 11 is another exploded view after the cup cleaner 4 and the water tap 5 in FIG. 1 are hidden. It can be seen from FIGS. 11 and 12 that the water division valve element 2 is disposed in the left-side chamber of the flow division seat 14, i.e., the accommodating cavity 16 described hereinafter.

In addition, the water division valve element 2 is provided with:
  the valve body 21, provided with a water inlet configured to guide water into the guide-in cavity 11 as well as the first water outlets 22 and the second water outlet 23 corresponding to the first water outlet cavity 12 and the second water outlet cavity 13 respectively; and
  the valve rod 26, rotatably arranged in the valve body 21 in a penetrating manner and rotating to independently open the first water outlets 22 or the second water outlet 23.

Therefore, the flow division water outlet device at least has the following two states:
  the water flow flows to the first flow passage 15 through the water inlet and the first water outlets 22 when the first water outlets 22 are opened; or
  the water flow flows to the second flow passage 142 through the water inlet and the second water outlet 23 when the second water outlet 23 is opened.

Figure 12:
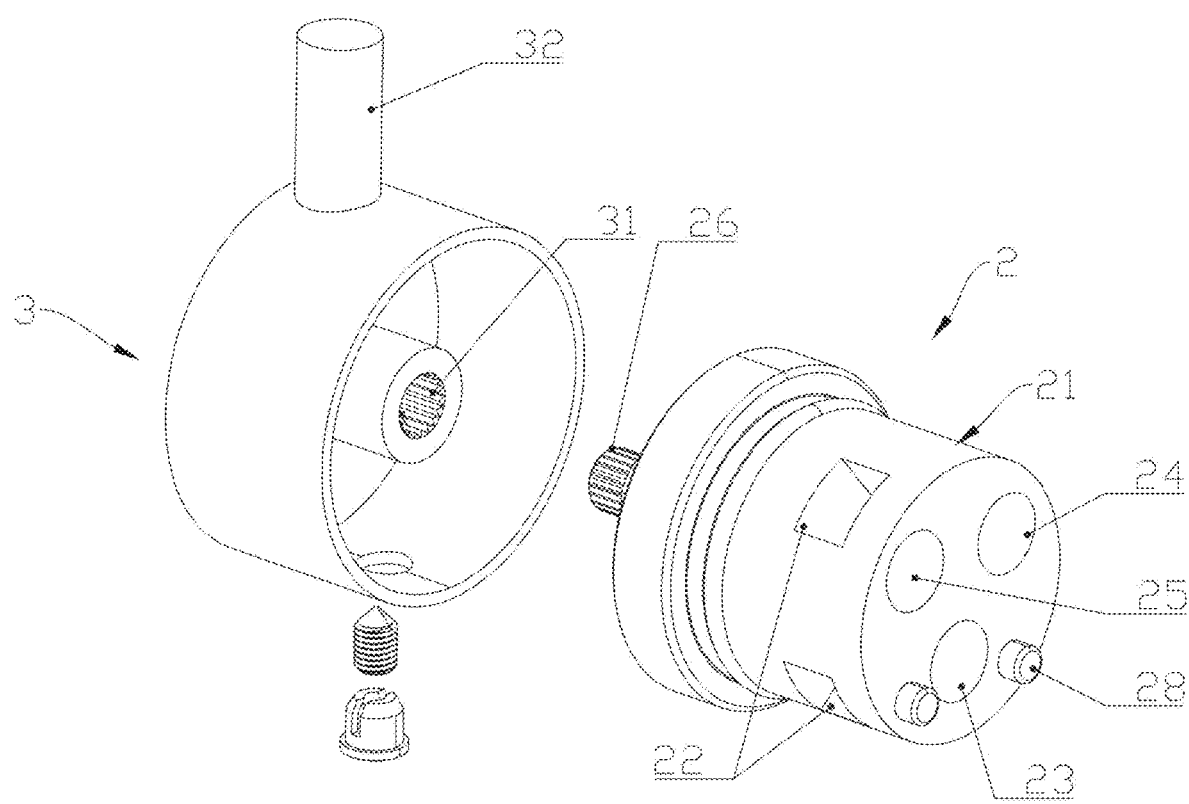
FIG. 12 is an exploded view of a handle and a water division valve element.

In addition, as shown in FIG. 10, the valve rod 26 at least partially extends from the device body 1. Then, referring to FIG. 11, the flow division water outlet device is further provided with the handle 3. The driving hole 31 is formed in the handle 3. The driving rod 32 is formed outside the handle. The handle 3 drives the valve rod 26 to rotate through the driving hole 31 when rotating, thereby realizing switching between different states. Moreover, as shown in FIGS. 10 to 12, a surface of the valve rod 26 is provided with toothed bars. An inner surface of the driving hole 31 is provided with tooth spaces. The tooth spaces are matched with the toothed bars such that the handle 3 drives the valve rod 26.

Particularly, referring to FIG. 12, FIG. 12 is an exploded view of the handle 3 and the water division valve element 2.

It can be seen from FIG. 12 that, in the present example, the water inlet includes:
  the cold water inlet 24 communicated with one end of the cold water flow passage 144; and
  the hot water inlet 25 communicated with one end of the hot water flow passage 143.

In addition, it can be seen from FIG. 12 that the number of the second water outlet 23 is not limited to only one. Particularly, in the present example, there are four second water outlets 23 formed around an outer edge of the valve body.

A related structure of the water division valve element 2 may refer to Chinese patent No. 201320125523X, which specifically discloses a ceramic valve element. In such case, a function of the valve rod 26 is similar to that of a shifting lever in this patent.

Alternatively, referring to Chinese patent No. 2012204650397, which specifically discloses a ceramic valve element.

Alternatively, referring to Chinese patent No. 2011104497537, which specifically discloses a ceramic valve element.

Alternatively, referring to Chinese patent No. 2019203557068, which specifically discloses a novel water division switching ceramic valve element. In such case, the function of the valve rod 26 is similar to that of a rotating rod in this patent.

In addition, in the present example, the water division valve element 2 serves to achieve seven states, specifically three states that cold water or hot water or cold-hot mixed water flows from the first water outlets 22, three states that cold water or hot water or cold-hot mixed water flows from the second water outlet 23, and a state that the first water outlets 22 and the second water outlet 23 are closed at the same time. A specific structure of the water division valve element 2 implementing dual water division and switching the three states of cold water or hot water or cold-hot mixed water specifically refers to the above-mentioned two patents.

Correspondingly, the flow division water outlet device of the present example also has seven states, i.e., three states that cold water or hot water or cold-hot mixed water flows from the first water outlet member, three states that cold water or hot water or cold-hot mixed water flows from the second water outlet member, and a state that both the first water outlet member and the second water outlet member are closed, totally seven states.

A state switching process is implemented by the handle 3 shown in FIGS. 1, 2, 10, and 11. The handle 3 rotates the valve rod 26 of the water division valve element 2 to implement switching.

In addition, as shown in FIGS. 5, 6, and 10, the accommodating cavity 16 is formed in one end of the device body 1. The water division valve element 2 is disposed in the accommodating cavity 16, and may be designed to be rotated leftwards to control the cup cleaner 4 to discharge water and rotated rightwards to control the water tap 5 to discharge water, or may be designed reversely. The water discharge state that both the cup cleaner 4 and the water tap 5 are closed is achieved at the positions shown in FIGS. 1 and 2.

It can be seen from FIGS. 10, 11, and 12 that the valve body 21 of the water division valve element 2 is provided with the cold water inlet 24 and the hot water inlet 25. Mainly referring to FIG. 10, the cold water inlet 24 is communicated with the other end of the cold water flow passage 144, specifically, is communicated with the tail end of the cold water flow passage 144, and further is arranged opposite thereto, i.e., the right end of the cold water flow passage 144 in FIG. 6.

The hot water inlet 25 is communicated with the other end of the hot water flow passage 143, specifically, is communicated with the tail end of the hot water flow passage 143, and further is arranged opposite thereto, i.e., the right end of the hot water flow passage 143 in FIG. 5.

Figure 8:
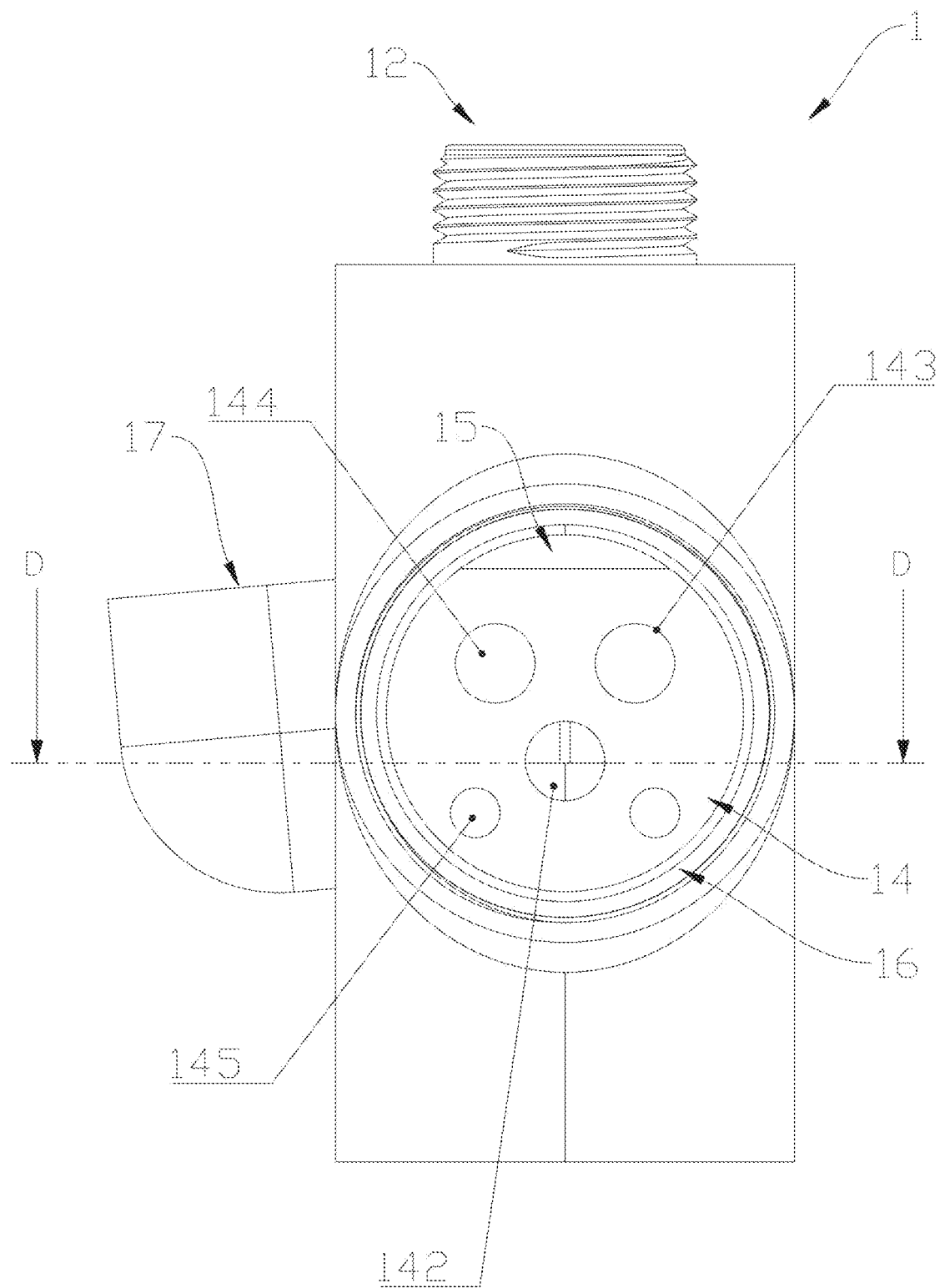
FIG. 8 is a side view of a device body.

Then, referring to FIG. 8, FIG. 8 is a side view of the device body 1, i.e., a right view in FIG. 4. It can be seen from FIG. 8 that, observed from the side of the accommodating cavity 16, totally five hole positions and one clearance are distributed in the flow division seat 14.

The upper two of the hole positions are end faces of the cold water flow passage 144 and the hot water flow passage 143 respectively. The bottom two of the hole positions are the positioning holes 145 configured to mount the water division valve element 2. Correspondingly, two positioning convex columns 28 adapted to the positioning holes 145 are arranged on the water division valve element 2.

Moreover, it can be seen from FIG. 8 that the second flow passage 142 is formed in the middle of the flow division seat 14. Then, referring to FIG. 9, FIG. 9 is a sectional view along a D-D direction in FIG. 8, i.e., a horizontal sectional view from the middle of the second flow passage 142.

Figure 9:
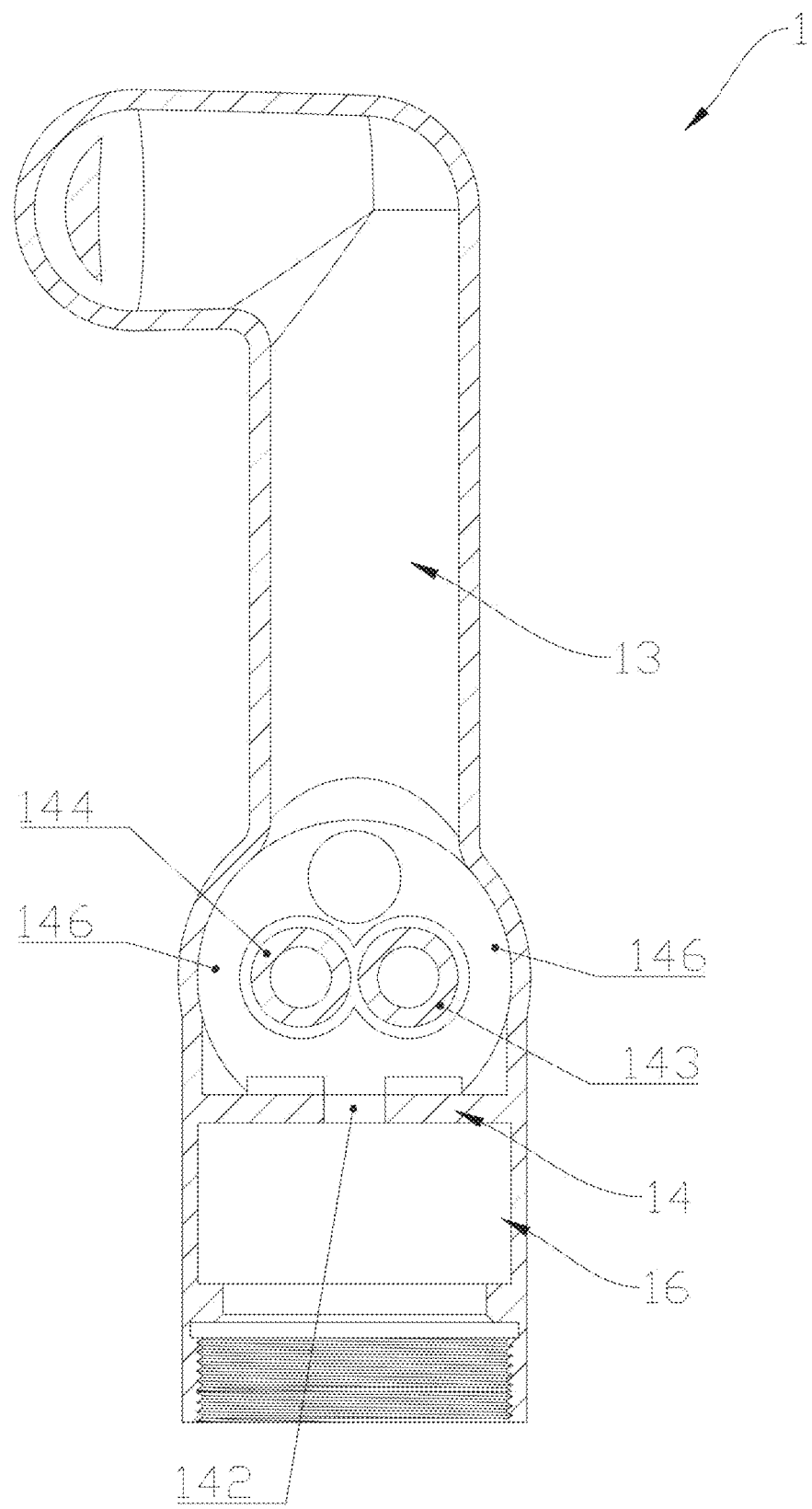
FIG. 9 is a sectional view along a D-D direction in FIG. 8.

It can be seen from FIG. 9 that the accommodating cavity 16, the flow division seat 14 and the second water outlet cavity 13 are sequentially arranged from bottom to top. The second flow passage 142 is formed in the middle of the flow division seat 14. Cross sections of the cold water flow passage 144 and the hot water flow passage 143 are above the second flow passage 142 respectively. Moreover, there is the drainage clearance 146 between the cross section of the cold water flow passage 144 and an inner sidewall of the flow division seat 14. Meanwhile, there is also the drainage clearance 146 between the cross section of the hot water flow passage 143 and the inner sidewall of the flow division seat 14.

Therefore, the water flow enters the second water outlet cavity 13 after flowing from the second water outlet 23 and through the second flow passage 142 and the drainage clearance 146, to be supplied to the cup cleaner 4.

Therefore, the second flow passage 142 penetrates through the flow division seat 14, and is communicated with the second water outlet cavity 13 and the second water outlet 23 respectively.

In addition, it can be seen from FIGS. 5 and 6 that the flow division seat 14 is further provided with the flow division upper wall 141. The first flow passage 15 is formed between the flow division upper wall and a front end of the first water outlet cavity 12. Two sides of the first flow passage 15 are communicated with the first water outlet cavity 12 and the first water outlet 22 respectively.

It can also be seen from FIGS. 5 and 6 that the above-mentioned flow division lower wall 147 also appears in FIGS. 5 and 6. The flow division lower wall 147 is configured to separate the guide-in cavity 11 from the second water outlet cavity 13 and cause the water flow to flow through the flow division lower wall 147 after entering from the guide-in cavity 11 and then enter the accommodating cavity 16.

Therefore, in the present example, the flow division upper wall 141 and the flow division lower wall 147 may be combined to further define a flow direction of the water flow after entering from the guide-in cavity 11. Furthermore, the water flow may be guided together at first to the side of the accommodating cavity 16 where the water division valve element 2 is located and then correspondingly distributed to the first water outlet member or the second water outlet member according to the state of the water division valve element 2.

Therefore, the water flow enters the first water outlet cavity 12 after flowing from the first water outlet 22 and through the first flow passage 15, to be supplied to the water tap 5.

In addition, it can be seen from FIGS. 1 and 2 that the cup cleaner 4 is provided with:

the tray 41, provided with the outlet 42 for water to flow out of the tray 41; and the elastic water outlet device 43, provided with a plurality of spraying arms 44. The spraying arms 44 are configured to spray water in the second water outlet cavity 13 to an object to be cleaned.

In addition, it can be seen from FIG. 3 that a threaded hole is formed in an upper end face of the left side of the device body 1. One end of the device body 1 is provided with the cup cleaner mounting position 17. The cup cleaner mounting position 17 is a position where the threaded hole is formed.

Moreover, in the present example, an upper end of the mounting position is a bevel configured to enable water in the tray 41 to flow out through the outlet 42.

A fastener is further disposed on the tray 41, and the fastener penetrates through both the tray 41 and the cup cleaner mounting position 17, namely penetrates through the threaded hole.

Figure 15:
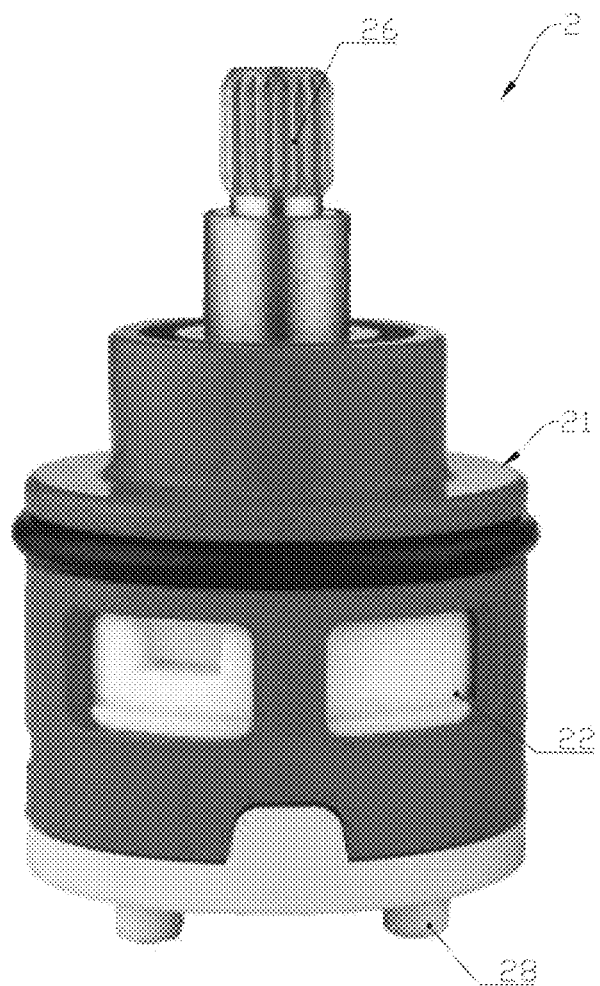
FIG. 15 is a three-dimensional diagram of a water division valve element.
Figure 16:
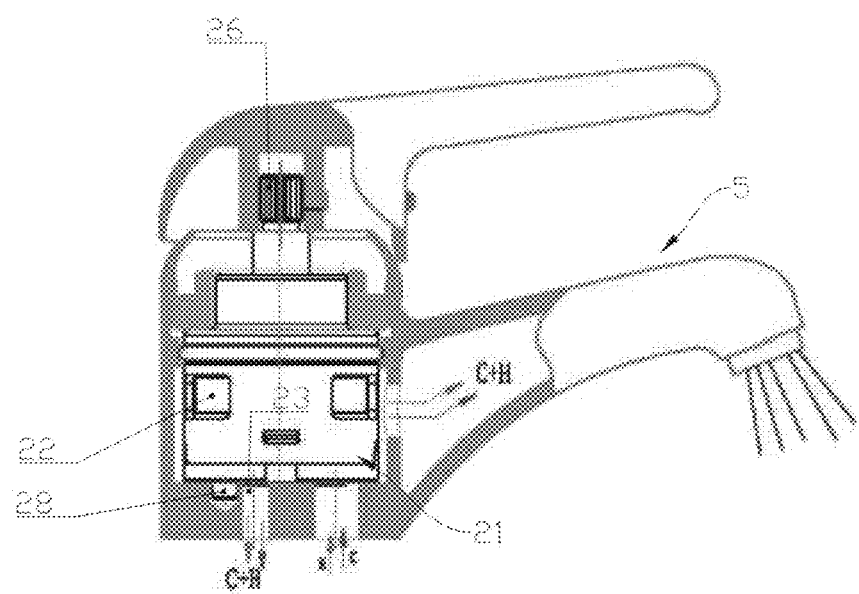
FIG. 16 is a schematic diagram when a water division valve element is applied to a water tap.

In order to further explain structural characteristics of the water division valve element, reference may further be made to FIGS. 15 and 16, in addition to the above-mentioned four patents and the other drawings. FIG. 15 is a three-dimensional diagram of a water division valve element. FIG. 16 is a schematic diagram when a water division valve element is applied to a water tap.

It can be seen from FIG. 15 that the water division valve element includes, from top to bottom, the valve rod 26 and the valve body 21 below the valve rod 26 respectively. In addition, two holes are formed in the valve body. The two holes are the first water outlets 22. There is the positioning convex column 28 at lower ends of the first water outlets 22.

In addition, specifically referring to FIG. 16, FIG. 16 is a schematic diagram when a water division valve element is applied to a water tap. It can be seen from the figure that the water division valve element is mounted in the water tap and the valve rod 26 of the water division valve element is connected with a knob of the water tap. In the figure, "C" represents cold water, and "H" represents hot water. In the figure, there is a window at the sign 22, and there is also a corresponding window at the right side. Both windows are the first water outlets 22. Therefore, it can be seen from FIG. 16 that water is discharged from the first water outlet 22 and flows from the right end of the water tap.

In addition, there is the positioning convex column 28 at the lower end of the first water outlet and the second water outlet 23 at the right side of the positioning convex column 28. There is a water inlet indicated by the upward arrow at one side of the second water outlet 23. Due to a projection relationship, the water inlet herein is divided into the hot water inlet 25 and the cold water inlet 24.

Moreover, it can be seen from the figure that all of the hot water inlet 25, the cold water inlet 24, the first water outlet 22 and the second water outlet 23 may discharge cold water, hot water and cold-hot mixed water.

It is to be pointed out that FIG. 16 is only one example of the water division valve element of the present example.

A working principle of Example 1 will now be described specifically.

At first, the guide-in cavity 11 at the lower end of the device body 1 is connected with a cold water pipeline and a hot water pipeline. The cold water pipeline and the hot water pipeline are connected with the cold water flow passage 144 and the hot water flow passage 143 respectively. Therefore, cold water enters the cold water flow passage 144 from the cold water pipeline respectively, and hot water enters the hot water flow passage 143 from the hot water pipeline respectively.

Then, the hot water flow passage 143 and the cold water flow passage 144 enter the accommodating cavity 16 after turning the straight corners respectively. In such case, the cold water inlet 24 and the hot water inlet 25 in the water division valve element 2 within the accommodating cavity 16 are correspondingly communicated with the cold water flow passage 144 and the hot water flow passage 143 respectively.

Next, the water division valve element 2 may have the above-mentioned seven states according to the action of the handle 3 on the valve rod 26. When water needs to be supplied to the first water outlet member, i.e., the water tap 5, the first water outlets 22 in the valve body 21 are opened, and the second water outlet 23 is closed. In such case, the water flow may enter the first water outlet cavity 12 through the first flow passage 15 because the first water outlets 22 are opened. Therefore, water may be supplied to the first water outlet member, i.e., the water tap 5.

When water needs to be supplied to the second water outlet member, i.e., the cup cleaner 4, the second water outlet 23 in the valve body 21 is opened, and the first water outlets 22 are closed. In such case, the water flow may finally enter the second water outlet cavity 13 through the second flow passage 142 and the drainage clearance 146 because the second water outlet 23 is opened. Therefore, water may be supplied to the second water outlet member, i.e., the cup cleaner 4.

Transformation 1

In Example 1, a bevel is formed at the upper end of the cup cleaner mounting position 17 to improve the drainage performance. In the present example, a lower end face inside the tray 41 is a bevel such that water may flow out through the outlet 42. The present example is applied to the condition that the tray 41 is a plastic part.

Transformation 2

Figure 13:
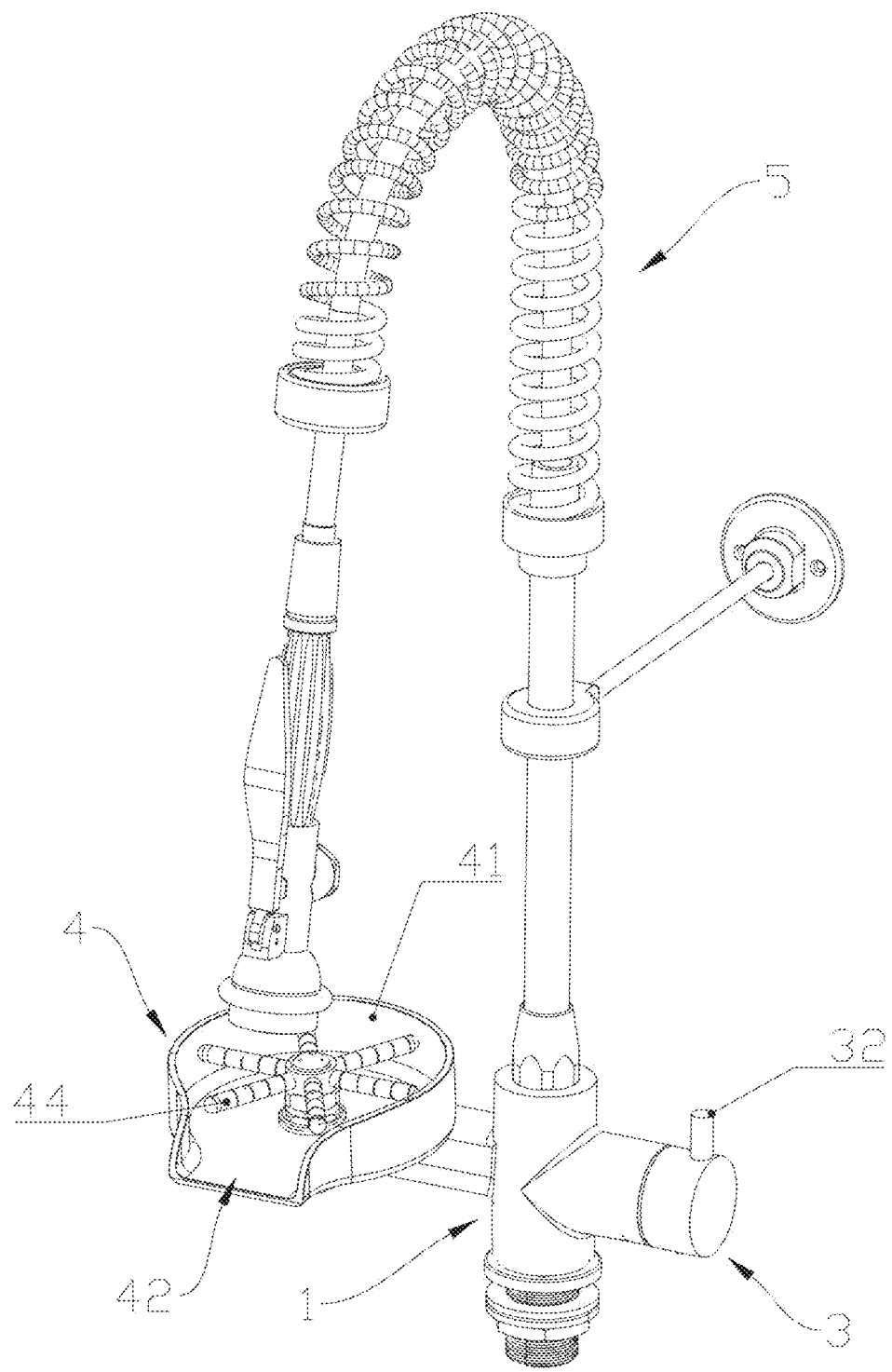
FIG. 13 is a schematic structural diagram of Transformation 2.
Figure 14:
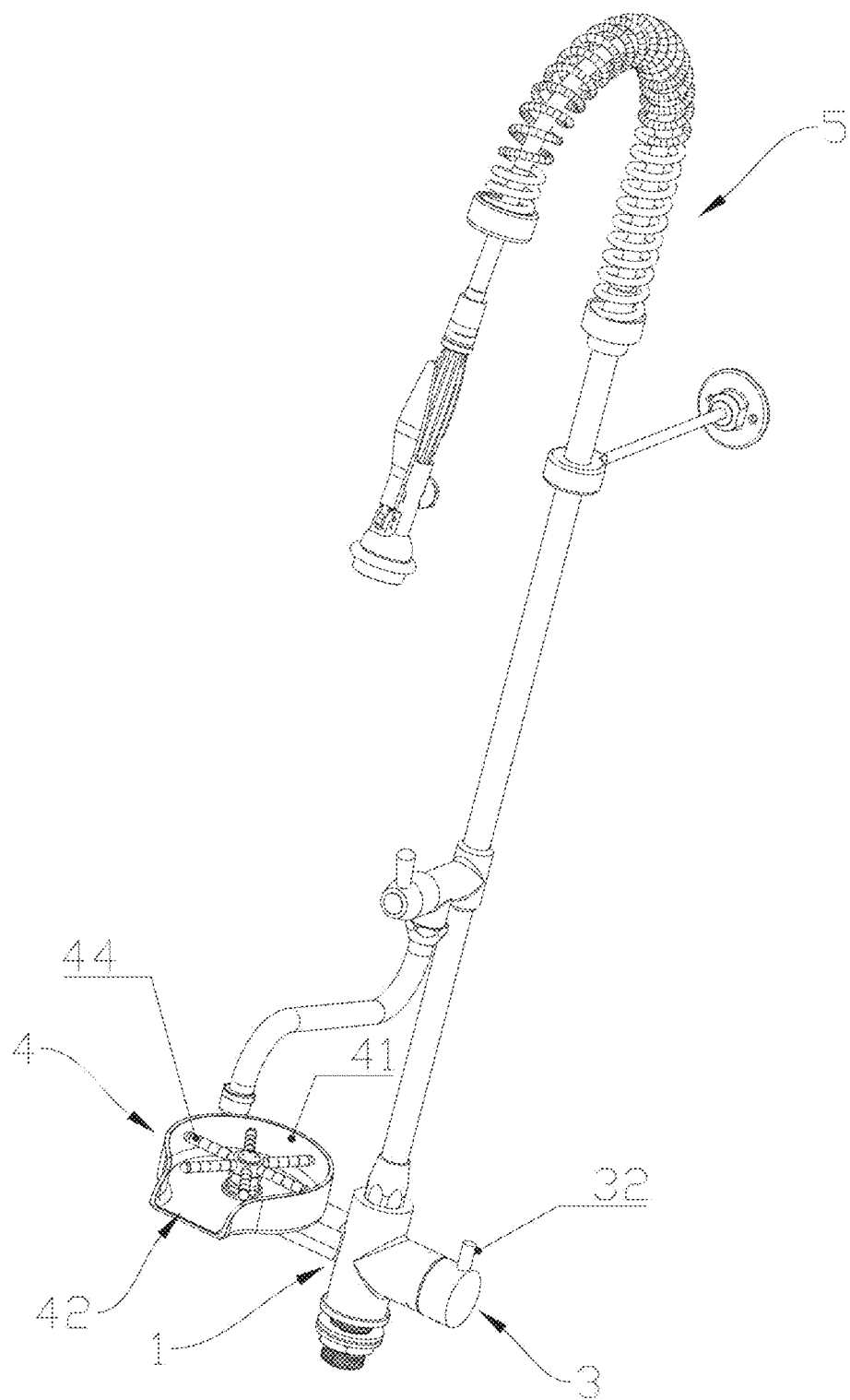
FIG. 14 is another schematic structural diagram of Transformation 2.

As shown in FIGS. 13 and 14, FIG. 13 is a schematic structural diagram of the transformation 2. FIG. 14 is another schematic structural diagram of the transformation 2. It can be seen from the two figures that, compared with FIGS. 1 and 2, styles of two different water taps 5 are disclosed in the present transformation, as shown in FIGS. 13 and 14.

The present invention may also be applied to different application scenes by using the water taps 5 of other styles instead.

Example 2

The present example has the following differences from Example 1.

The first water outlet member is the cup cleaner 4.

The second water outlet member is the water tap 5.

Such a design has the advantage that a requirement on the high-frequency use of the cup cleaner 4 may be met. In addition, it may be ensured that the first water outlet member and the second water outlet member of the present invention are replaceable. Alternatively, even both water outlet members are the cup cleaners 4, or both water outlet members are the water taps 5.

All the features or the steps in all the methods or processes disclosed in the specification, except mutually exclusive features and/or steps, may be freely combined.

Any features disclosed in any appended claims, abstract and drawings in the specification may be replaced with other equivalent or alternative features with similar objectives, unless otherwise stated. That is, each feature is merely an example of a series of equivalent or similar features, unless otherwise stated.

In the descriptions of the present invention, it is to be understood that orientation or position relationships indicated by terms "one end", "the other end", "outer side", "upper", "inner side", "horizontal", "coaxial", "center", "end portion", "length", "outer end" and the like are based on orientation or position relationships shown in the drawings. These terms are only for easily describing the present invention and simplifying the description and not intended to indicate or imply that the specified device or component must have a specific orientation or must be constructed and operated in the specific orientation, and thus should not be understood as limits to the present invention.

In addition, in the description of the present invention, "multiple" means at least two, for example, two and three, unless otherwise defined specifically.

Terms indicating spatial relative positions, such as "upper", "above", "lower" and "below", in the present invention, describe a relationship between a unit or feature and another unit or feature shown in the drawings, for the ease of description. The terms indicating spatial relative positions may be intended to include different orientations of the device during use or work, besides those in the drawings. For example, if the device in the drawing is overturned, a unit described as being located "below" or "under" another unit or feature is located "above" the other unit or feature. Therefore, exemplary term "below" may include two orientations, i.e., above and below. The device may be directionally rotated by 90 degrees or achieve other orientations in other manners, and space-related descriptions used herein are explained accordingly.

In the present invention, unless otherwise definitely specified and limited, terms "arranged", "sleeving connection", "connected", "penetration", "inserted" and the like should be understood broadly. For example, the terms may be understood as fixed connection, detachable connection or integration. The terms may be understood as mechanical connection and electrical connection. The terms may be understood as direct connection, indirect connection through a medium or communication in two components or an interaction relationship of the two components, unless otherwise clearly specified. Those of ordinary skill in the art may understand the specific meanings of the terms in the present invention according to specific conditions.

The above-mentioned example is only the preferred example of the present invention and not thus intended to limit the scope of protection of the present invention. Therefore, any equivalent variations made according to the structure, shape and principle of the present invention shall fall within the scope of protection of the present invention.

What is claimed is:

1. A flow division water outlet device configured to guide a water flow to a first water outlet member and a second water outlet member respectively and comprising:
   a device body, internally provided with a flow division seat, wherein the flow division seat divides an inside of the device body into a first water outlet cavity, a second water outlet cavity, an accommodating cavity and a guide-in cavity;
   wherein the first water outlet cavity guides the water flow to the first water outlet member, and a first flow passage is formed between the first water outlet cavity and the accommodating cavity;
   the second water outlet cavity guides the water flow to the second water outlet member, and a second flow passage is formed between the second water outlet cavity and the accommodating cavity;
   a water inlet passage is formed between the accommodating cavity and the guide-in cavity; and
   the flow division water outlet device further comprises a water division valve element, disposed in the accommodating cavity and configured to guide the water flow to the first flow passage or the second flow passage respectively,
   and further comprising
   a valve body, provided with a water inlet corresponding to the water inlet passage as well as first water outlets and a second water outlet corresponding to the first flow passage and the second flow passage respectively; and
   a valve rod, one end being at least partially arranged in the valve body in a penetrating manner,
   the valve rod is configured to rotate to independently open the first water outlets or the second water outlet;
   such that the flow division water outlet device at least has the following two states:
   the water flow flows to the first flow passage through the water inlet and the first water outlets when the first water outlets are opened; or
   the water flow flows to the second flow passage through the water inlet and the second water outlet when the second water outlet is opened;
   wherein
   the first water outlet member is a water tap, a water outlet end being capable of rotating to be above a cup cleaner; and
   the second water outlet member is the cup cleaner, such that the cup cleaner and the water tap may clean an inner lateral surface and an outer lateral surface of a container respectively when the water outlet end of the water tap rotates to be above the cup cleaner and
   the flow division seat is provided with:
   a flow division upper wall, configured to separate the accommodating cavity from the first water outlet cavity, the first flow passage being formed between the flow division upper wall and an inner wall surface of the device body; and
   a flow division lower wall, configured to separate the guide-in cavity from the second water outlet cavity and cause the water flow to flow through the flow division lower wall after entering from the guide-in cavity and then enter the accommodating cavity.

2. The flow division water outlet device according to claim 1, wherein the valve rod at least partially extends from the device body; and
   the flow division water outlet device is further provided with a handle, a driving hole is formed in the handle, and the handle drives the valve rod to rotate through the driving hole when rotating.

3. The flow division water outlet device according to claim 1, wherein the water inlet passage is formed in the flow division seat, and comprises a hot water flow passage and a cold water flow passage;
   the water inlet comprises:
   a cold water inlet, communicated with one end of the cold water flow passage; and
   a hot water inlet, communicated with one end of the hot water flow passage.

4. The flow division water outlet device according to claim 3, wherein at least one of the hot water flow passage and the cold water flow passage is a flow passage with a straight corner.

5. The flow division water outlet device according to claim 1, wherein the cup cleaner is provided with:
   a tray, provided with an outlet for water to flow out of the tray; and
   an elastic water outlet device, provided with a plurality of spraying arms, the spraying arms being configured to spray water in the second water outlet cavity to an object to be cleaned.

6. The flow division water outlet device according to claim 5, wherein a fastener is further disposed on the tray, and the fastener penetrates through both the tray and a cup cleaner mounting position.

7. The flow division water outlet device according to claim 1, wherein
   one end of the device body is provided with a cup cleaner mounting position, and an upper end of the mounting position is a bevel configured to enable water to flow out through the outlet; or
   a lower end face inside the tray is a bevel such that water may flow out through the outlet.

* * * * *